D. B. EBERLY.
Harrow.
No. 227,506.
Patented May 11, 1880.
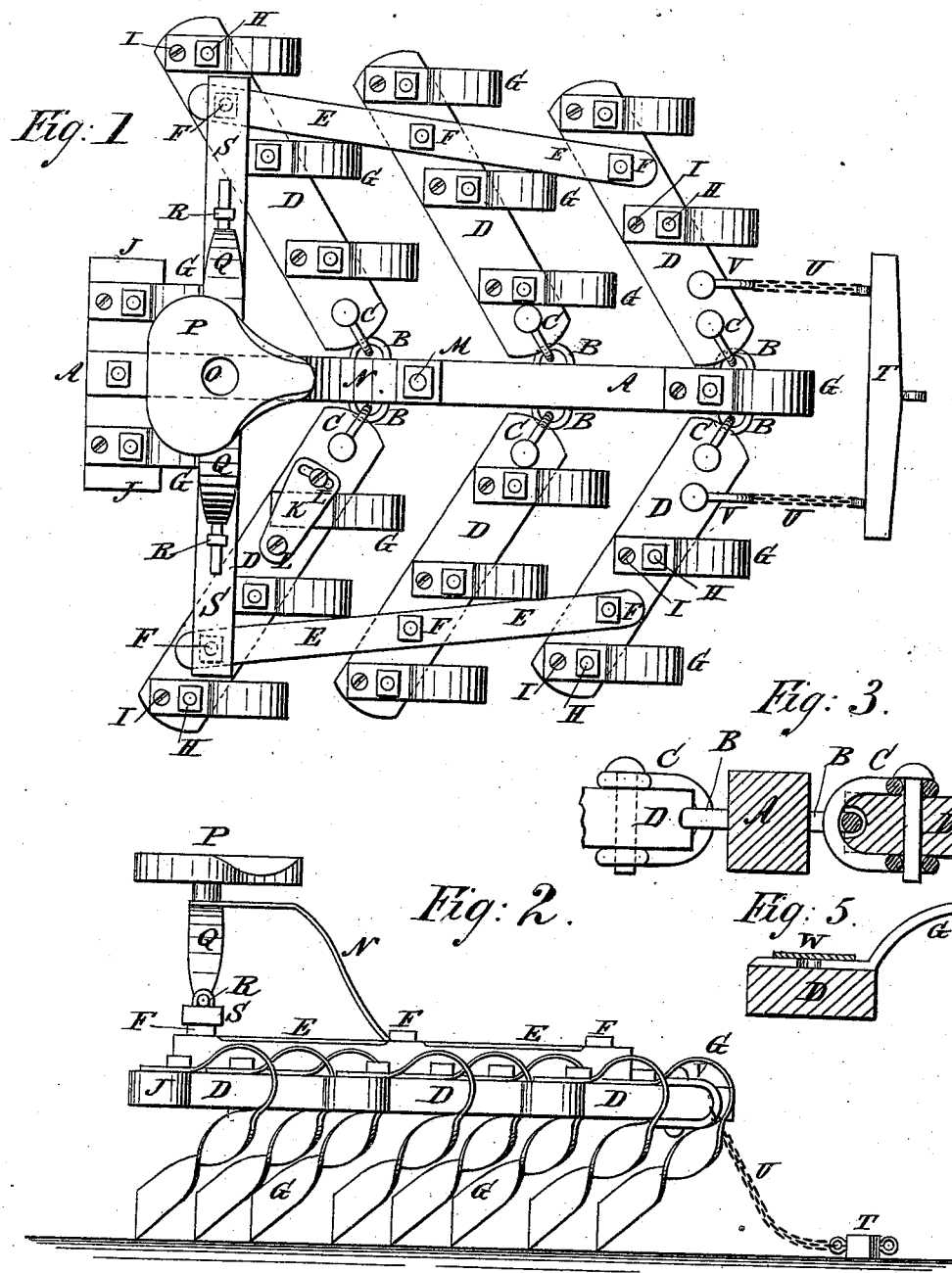
WITNESSES:
A. Schehl.
C. Sedgwick
INVENTOR:
D. B. Eberly
BY 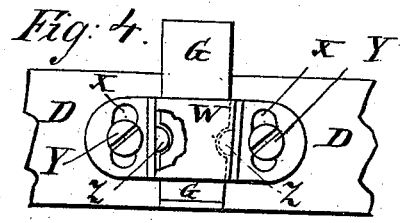
ATTORNEYS.

UNITED STATES PATENT OFFICE.

DAVID B. EBERLY, OF BOSWELL, INDIANA.

HARROW.

SPECIFICATION forming part of Letters Patent No. 227,506, dated May 11, 1880.

Application filed January 8, 1880.

*To all whom it may concern:*

Be it known that I, DAVID BOLDEN EBERLY, of Boswell, in the county of Benton and State of Indiana, have invented a new and useful Improvement in Harrows, of which the following is a specification.

Figure 1 is a plan view of the improvement. Fig. 2 is a side elevation. Fig. 3 is a sectional elevation, showing the coupling. Fig. 4 is a plan view, showing a device for securing the teeth to the beams. Fig. 5 is a sectional elevation.

The object of this invention is to furnish harrows so constructed as to cut in pieces lumps and sods and pulverize the soil, and which will adapt themselves to uneven ground, and can be adjusted wider or narrower as required.

Similar letters of reference indicate corresponding parts.

A is the central beam of the harrow, in which are inserted, in horizontal positions, two or more links, B, with their ends projecting upon the opposite sides of the said beam. The links B may be inserted in transverse mortises in the beam A, or the beam A may be made in two parts bolted together and clamping the links B between them, notches being formed in the adjacent sides of the said parts to receive the side bars of the said links. Through the ends of the links B are passed the clevises C, the ends of which are secured to the ends of the side beams, D. The side beams, D, are connected together and held parallel with each other by the longitudinal bars E, secured to them at or near their outer ends by the bolts F. With this construction, by loosening the nuts of the bolts F, the side beams, D, may be adjusted at a less or greater inclination to make the harrow wider or narrower, as may be required.

G are the harrow-teeth or cutters, the upper parts of which are bent into U form, and their upper ends are secured to the side beams, D, by bolts H, or by bolts H and screws I. The lower arms of the teeth G are extended or made longer than the upper arms, are inclined downward, and are made sharp and pointed, so that they will enter the ground to the required depth, and will cut in pieces all lumps and sods. The parts of the lower arms of the teeth G between the parts that enter the ground and the bends are twisted or made in spiral form, as shown in Fig. 2, to cause them to thoroughly pulverize the soil. A single tooth, G, is attached to the forward end of the center beam, A, and to the rear end of the said center beam is attached a short cross-bar, J, to the ends of which are attached teeth G. With this arrangement the tooth attached to the forward end of the center beam, A, will operate upon the ground beneath the said beam A, and the teeth G, attached to the ends of the cross-beam J, will operate upon the soil beneath the inner ends of the side beams, D, so that the whole surface of ground passed over by the harrow will be thoroughly stirred and pulverized.

If desired, the upper ends of the teeth G may be secured in place by clamping-plates K, which cross the said upper ends of the said teeth and are secured at their ends by the bolts L.

One of the bolts L passes through a short slot in the end of the plate K, so that it and the tooth may be adjusted as may be required without its being necessary to remove the fastening-bolts.

The teeth G may also be secured to the beams D by plates W, which are recessed upon their lower sides to fit upon the shanks or upper arms of the teeth G, and have short curved slots X in their ends to receive the bolts Y, by which they are secured to the beams D, so that the teeth G may be adjusted by loosening the bolts Y.

In the side parts of the recess in the cap-plate W are formed, or to it are attached, two projections or lugs, Z, to enter notches in the side edges of the upper arm or shank of the tooth G, to prevent the said tooth from slipping upon the plate W when the harrow is in use.

To the middle part of the center beam, A, is pivoted by a bolt, M, the lower end of a bar, N, which is curved upward and rearward, and to its upper end is pivoted by a bolt, O, the driver's seat P. To the bolt O is also pivoted the middle part of the arched bar Q, the end parts of which are rounded off, and are inserted in the eyes of eyebolts R or other keepers attached to the cross-bar S.

The cross-bar S rests loosely upon the top of the harrow, so that it may not interfere with the movement of the parts of the harrow in adjusting themselves to uneven ground, and may be adjusted to bring the driver's weight over any desired part of the harrow.

T is the draw-bar, to the center of which the draft is applied. To the ends of the draw-bar T are attached the forward ends of two short chains, U, the rear ends of which are secured by clevises V to the inner parts of the forward side bars, D, as shown in Fig. 1.

Having thus fully described my invention, I claim as new and desire to secure by Letters Patent—

1. The teeth G, constructed as herein shown and described, with their upper parts bent into U form and their middle parts made in spiral form to pulverize the soil, as set forth.

2. In a harrow, the combination, with the frame A D and the teeth G, of the cap-plates W, made with recesses to receive the shanks of the teeth, having curved slots in their ends to receive the fastening-bolts, and provided with lugs Z to enter notches in the side edges of the teeth-shanks, substantially as herein shown and described, for securing the teeth to the frame adjustably, as set forth.

3. The combination, with the harrow-frame, of the bar N, bolt O, seat P, arched bar Q, having rounded ends, and loose cross-bar S, having eyebolts R, as and for the purpose specified.

DAVID BOLDEN EBERLY.

Witnesses:
ESTHER E. RICHARDS,
ALLEN J. EBERLY.